Feb. 23, 1965   L. NORRIS ETAL   3,170,421
SUBMULCHER AND PLANTER IN COMBINATION THEREWITH
Filed Aug. 23, 1961   2 Sheets-Sheet 2
FIG. 4
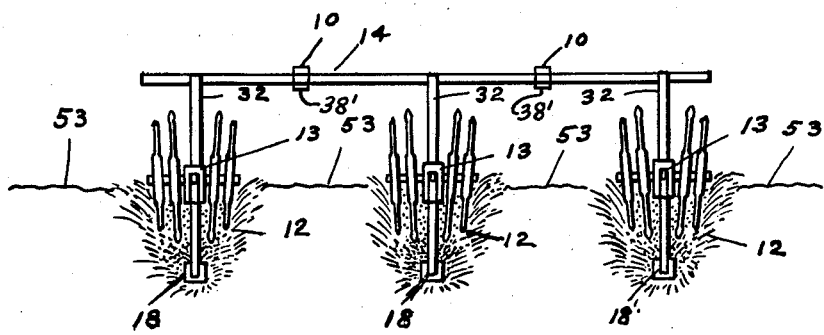
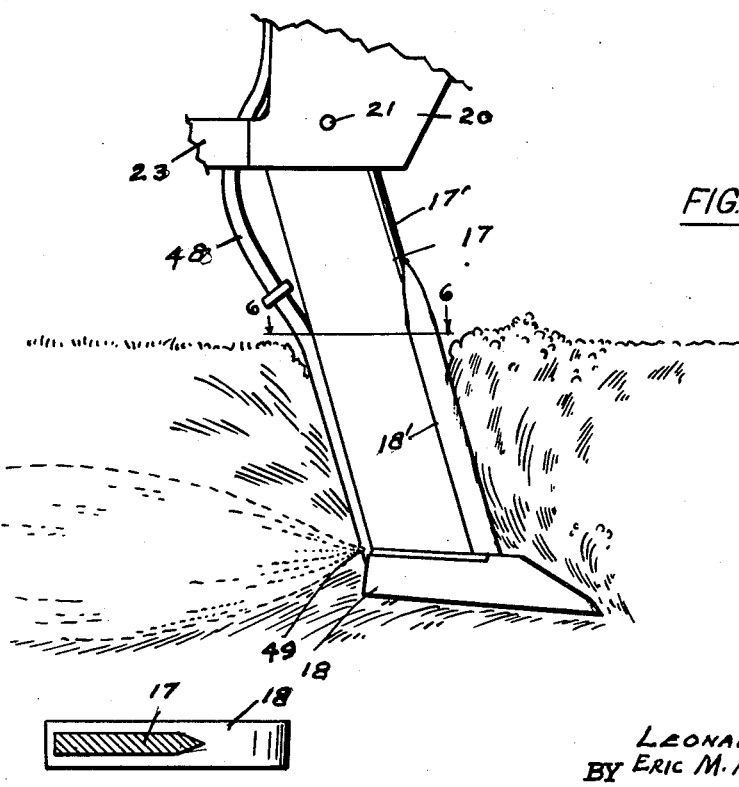
FIG. 5
FIG. 6
INVENTORS
LEONARD NORRIS
BY ERIC M. McELHINNEY

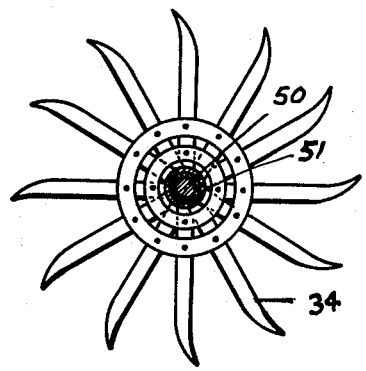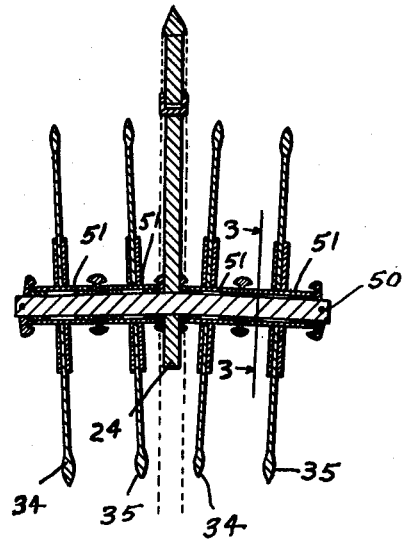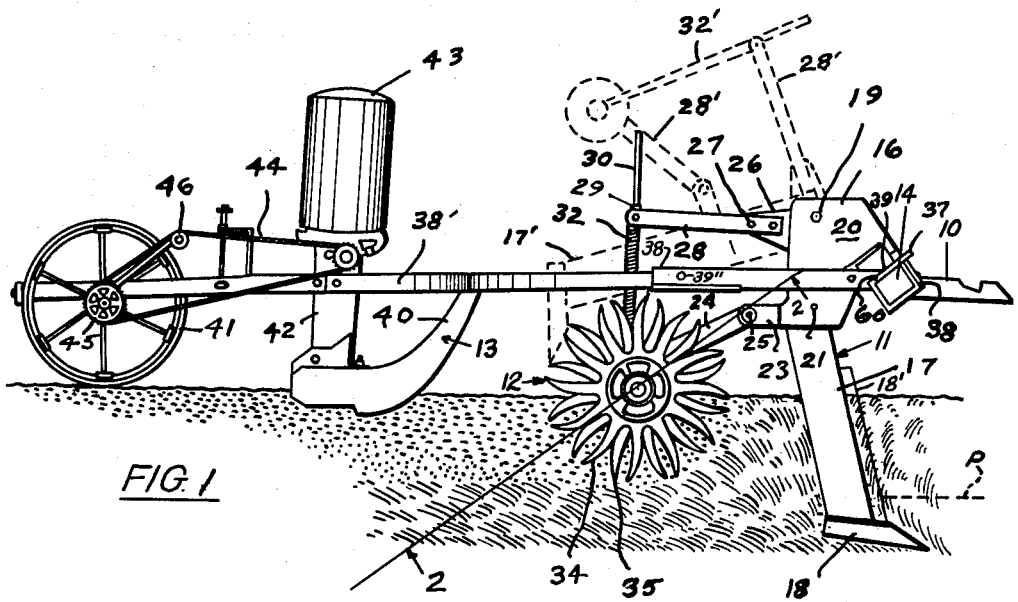

United States Patent Office 3,170,421
Patented Feb. 23, 1965

3,170,421
SUBMULCHER AND PLANTER IN COMBINATION THEREWITH
Leonard Norris, Reinbeck, and Eric M. McElhinney, Jesup, Iowa
Filed Aug. 23, 1961, Ser. No. 133,389
4 Claims. (Cl. 111—1)

This invention relates to soil tilling equipment and, more particularly, to combinations of subsoilers, tillage equipment, and planting equipment.

This application is a continuation in part of patent application, Serial No. 821,212, filed June 18, 1959, which issued as Patent No. 3,042,118 on July 3, 1962.

Present agricultural techniques emphasize the depressing influence of soil compaction on maximum crop yield. A compacted soil is a soil whose apparent density is sufficiently high to adversely affect crop production. The pore spacing in compacted soil is greatly reduced and water penetration is slow or almost wholly retarded. The size of soil aggregates or structures are reduced, particularly in the coarse range in soils where compaction has been induced, and air movement is lower in compacted soils than in soils of good tilth. Root penetration is limited and feeding area of roots is drastically reduced. Also, the microbiological activity is much less in compacted soil than in well aerated soil.

The machine disclosed herein is intended to reduce or eliminate compaction. In so doing, it breaks up the compacted soil far below the depth to which a normal moldboard plow normally runs. The rotary pulverizer which follows the sub-soiler chisel operates at a depth comparable to the depth ordinarily penetrated by the ordinary moldboard plow and the planter which follows the pulverizer is intended to plant a row of seeds directly over the slot cut in the soil by the chisel blade. Thus, with one operation, the ground is broken, levelled, and planted. Thus, repeated traverse of heavy machinery is eliminated and the soil is not compacted. By utilizing three of the foregoing tools behind a tractor, the soil may be tilled along the plant rows and not tilled between the plant rows, thus preventing erosion and eliminating the necessity of contour farming. The culti-packer as well as the subsoiler can be used without the planter to cultivate the crop and therefore break up the unbroken rows between the crop rows after the row crop has grown to a given height.

The pulverizer tines are alternately inclined on alternate rows to form an improved pulverizer. The fertilizer attachment places the fertilizer far below the seed where it will not contact and, therefore, sterilize the seed as will occur with fertilizer such as anhydrous ammonia used in the ordinary fertilizer dispensing machine.

The most important design of the submulcher planter combination is the one designed for mounting on a tool bar which is attached to the rear lifting arms of a modern tractor which are actuated by the built in hydraulic system of the tractor. The same tool bar equipped with the same submulcher planter combination units will also work equally well if drawn behind the tractor, the tool bar being carried on its own wheels and either controlled with a remote control hydraulic cylinder, trip rope raising clutch such as used on pull plows, or hand levers. In this case, the wheels which carry the unit are placed ahead of the shoe blades and directly in line behind the tractor wheels, thereby mulching all compaction caused by both the tractor wheels and the tool bar wheels.

The shoe blades mounted on the tool bar are inclined forwardly so that when blades are operating in the soil at a normal depth of twelve inches, the shoes will be under the tractor tire, eliminating as much leverage as possible which would affect easy steering of the tractor and, in addition, following very closely the vertical and lateral movement of the tractor wheels' negotiating undulating or rough ground conditions, thereby maintaining as uniform depth and straight blade fissures as possible in the varying irregularities in a field.

The culti-mulching modified rotary hoe type wheels follow immediately behind the shoe blades to also be as close to the tractor wheels as possible and for the purpose of closing the shoe blade fissures to any chosen depth down to at least seven inches for making an erosion resistant, desirable seed bed for planting at the top of the fissure, at the same time mulching and very effectively cultivating the soil at a width which is somewhat wider than the width of the traction tire of the tractor. This also eliminates the erosive compacted, concave tractor tire impression in the soil.

Fertilizers of all types may be applied at any desired depth behind the shoe blade in the fissure and in case anhydrous ammonia is used, it can be sealed in the fissure at shoe level and cannot harm seed that is planted near the top of the sealed in fissure. Further, it is quickly available to the roots of the growing crop which hastily find their way down to the bottom of the fissure.

The central shaft whereon the culti-mulcher wheels are disposed is angled slightly backward from the center at both ends, resulting in an improved mulching and pulverizing action in addition to a better fissure filling action desirable for top fissure planting and sealing anhydrous ammonia and the like near fissure bottom.

The culti-mulcher is held to the desired depth in the ground by spring pressure which is adjustable for the depth desired, the springs also protecting the wheels when foreign objects are encountered in the ground.

Due to the alternate arrangement of the culti-mulcher wheels, they are self-cleaning and will deposit weeds and the like on the surface of the ground where they are exposed to fast deterioration.

The culti-mulcher unit is attached to the shoe blade which is provided with a shear pin to prevent damage to parts when striking hard objects such as rocks, etc. When the shear pin is cut and releases the unit comprising the sub-mulcher with culti-mulcher attached, the whole unit swings backwards and inwardly until it clears the object.

Individual planting units are attached to the tool bar in such a manner as to be the proper distance behind the culti-mulcher assembly so as not to interfere with action of the same when the shear pin releases the unit to clear an obstruction. The planter will remain in the ground when such action occurs but will rise out of the ground for transportation, end turning, etc. when the tractor hydraulic unit raises the tool bar up for that purpose.

With the use of the present invention, soil erosion is almost completely halted even on undulating terrain and even without the use of present soil conservation practices such as terracing, strip farming, or contour farming.

After a heavy rain, the water will not wash down the slopes but will soak into the ground which has been submulched which has a complete absence of compaction, commonly due to shallow plowing, heavy wheel compaction, etc., and an excess of water will drain slowly away underground in the small passages made by the blade shoes, thereby allowing the soil to accumulate all the water it will hold to at least a depth of twelve inches. This condition will stand a much more extended drought than the current seed bed and cultivation practices.

Due to the twelve inch depth of the mulched condition of the soil and the entire absence of compaction, the roots of the growing crops extend further downwardly and laterally so that plant nutrients in the soil are gleaned from a much larger area than usual, resulting in increased yields and higher protein and vitamin content in the resulting crops. It has been found that due to the twelve inch depth of non-compacted, mulched conditions of the seed bed, there is a heavy accumulation of nitrogen and oxygen in the soil from the rain and the air taking place day after day, almost discounting the need for added commercial nitrogen which escapes and is used up faster than the other members of the trinity (nitrogen, phosphate, and potash), resulting in a high content of protein in the harvested crop which in turn cuts down the need for commercial protein feeds for poultry, etc.

It has been observed that when the submulcher was simply used between the rows of a conventionally planted crop, the benefits derived were an increase in yield of twenty percent or more in some instances and the grain had a higher nutritive value.

Planting near the top of the blade fissure where the insecticides, fertilizers, weed control chemicals, etc. have been placed in their proper positions promotes the fast development of the roots to reach whatever has been placed in the fissure and gets the crop off to a fast start which means higher efficiency and cuts waste to a minimum in the use of fertilizers, insecticides, weed control chemicals, etc. inasmuch as it cuts down the volume of materials used, doing as good or better job with less material.

It is the furtherest advance in minimum tillage that has thus far been accomplished as it will meet almost all conditions, eliminating the use of a moldboard plow completely. The soil is in a more desirable state of pulverization and loosening than is possible with the use of a moldboard plow with all of the sustaining and complementary equipment which traditionally go with it. The only requirement is that surface litter, straw, stalks, vines, etc. be reduced and chopped to a consistency that will incorporate into the soil readily.

The submulcher method of tillage leaves the harvested fields in a smooth, flat, undisturbed condition as opposed to the topography of hilled and cultivated rows. It also eliminates all dead furrows and movement of soil caused by the moldboard plow. The soil is left, worked, and developed in its original position.

Due to the fast expanding use of chemical control of weeds, grasses, etc., it is possible to plant crops, apply fertilizers, insecticides, weed control chemicals, etc. with one trip over the field and the full operation before harvesting is completed by covering not over half of the field with the tillage equipment as the untouched strips between the rows can now be controlled with chemicals applicable at the same time. If necessary, however, after the crop is at a cultivating height, the weeds can be very effectively taken care of and the soil mulched some more by submulching between the rows where the shoe blades will not damage the roots and the blades operate in the center between the rows.

There are economic benefits derived from the use of the submulcher planter combination disclosed herein such as low maintenance cost, simplicity of parts and design, no plow scouring troubles, and simplified individual planter units easily removed and stored and which are devoid of all conventional attachments. This also provides better crops, minimum tillage, higher nutrition, and less need for fertilizer, bringing forth higher than average dividends.

It is, accordingly, an object of the present invention to provide an improved subsoiler and tilling machine.

Another object of the invention is to provide an improved rotary cultivator.

A further object of the invention is to provide an improved submulcher in combination with a cultivator and planter.

A still further object of the invention is to provide a submulcher which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a side view of a machine according to the invention;

FIG. 2 is a cross sectional view taken on line 2—2 of FIG. 1;

FIG. 3 is a cross sectional view taken on line 3—3 of FIG. 2;

FIG. 4 is a rear view of the machine shown schematically;

FIG. 5 is a side view of the submulcher showing a fertilizer attachment connected thereto; and FIG. 6 is a view of the blade.

Now with more particular reference to the drawings, the submulcher shown has a hitch arrangement 10 attached to a transverse bar 14 which is preferably square in cross section. The bar 14 has spaced tillage units 16 attached thereto which are made up of a submulcher unit 11, rotary hoe members 12, and planters 13.

The submulcher unit includes elongated plate like, downwardly extending blades 17 having their leading edges sharpened and chisels 18 on the lower ends thereof. The blades 17 are swingably connected by a bolt 19 between plates 20. The bolt 19 extends through both plates 20 and through the upper ends of the blades 17. A small bolt 21 spaced from the bolt 19 extends through the blades 17 and the plates 20 and holds the blades rigidly thereto. The bolt 21 is smaller than the bolt 19 so that it will shear off should blade 17 strike an immovable obstruction.

The plates 20 are notched to receive the square bar 14 and are firmly welded thereto. Gusset plates 60 are disposed at right angles to the plates 20 and extend laterally therefrom. These plates 60 extend around the bar 14 and have bolts 38 extending through them to clamp the entire submulcher assembly rigidly to the bar 14.

A rolling cultivator assembly is attached to each said subsoiler blade. Each rolling cultivator assembly is made up of a lever 24, an axle 50, and rotary hoe member 12.

Brackets 23 are welded to the blades 17 and extend rearwardly and downwardly and have levers 24 swingably connected thereto by a bolt 25. The upper part of the blade 17 has a rearwardly extending ear 26 welded thereto.

Rearwardly extending arms 28 are rigidly fixed to the ear 26 by means of bolts 27. The arms 28 are made up of two spaced plate like members with a sleeve 29 received therebetween and swingable thereon about its transverse axis. The sleeve 29 slidably receives rods 30 and the rods 30 are pivotally attached at their lower ends to the levers 24. A helical compression spring 32 is received between the sleeve 29 and the lever 24 on each machine unit and this urges the rotary hoe member 12 into the ground.

The front lower edge of the blade 17 is sharpened and the upper part of the leading edge is rounded at 17' to give it strength. The blades incline forward about twenty degrees from the vertical and the top surface of the chisel 18 is inclined downwardly about twenty-five degrees.

It will be seen that the brackets 23 and the ear 26 carry the rotary hoe so that if the chisel 18 strikes a stone or other obstruction, it may shear off the bolt 21 and swing backward around the bolt 19, carrying levers 24 and arms 28 upwardly to the positions 24' and 28' and the spring 32 to the position 32' with the blade 17 coming to the position 17', thus clearing the obstruction.

The cultimulcher wheels have spring steel tines 34 and 35 thereon. It will be seen that the tines 34 on alternate wheels are inclined in one direction and the tines 35 on intermediate alternate wheels are inclined in the other direction and since the tines which are inclined against the direction of rotation tend to run slower than those inclined toward the direction of rotation, the wheels will tend to run at a different rate and a more pronounced digging action and pulverizing action will occur. In other words, the tines on every other wheel are curved in the opposite direction from the one next to it. Also, the outer cultimulcher wheels are smaller in diameter than the inner cultimulcher wheels. For example, the outer wheels could be two inches less in diameter. It has also been found that staggering the tines of the cultimulcher wheels, that is, bending the tines three-fourth inch to one side of center, alternating from left to right, covers more area with the same number of wheels, with the tines cleaning better.

The planter 13 has spaced tongue members 38' which extend forwardly in a plane with the blades 17, then laterally, and then forwardly and are clamped to the square bar 14 at 39. The tongue members 38' support runners 40 as well as wheels 41. The tongue members 38' are removably attached to frame 38" by bolts 39" or the like. The planter 13 is a component of a generally conventional type with a seed box 43 on the upper side thereof having a suitable dropping mechanism therein actuated by a chain 44 which is driven by a sprocket 45 on the wheel 41. A chain tightener 46 is suitably supported thereon.

As the machine rolls forward, seed will be dropped at spaced intervals between the runners 40 into the space directly over the groove cut by the blade 17. The soil over this groove is pulverized by the rotary hoe 12 and any fertilizer is sealed below the surface.

It will be seen that the chisel 18 runs at a substantial depth while the rotary hoe blades run at a lesser depth; that is, a depth approximately the same as normally penetrated by an ordinary moldboard plow while the chisels run at a substantially greater depth which may be, for example, twelve inches or more. Since the chisel blade runs at a depth greater than that penetrated by the ordinary moldboard plow, any plow sole formed in the ground will be broken up and the soil will be pulverized to the depth normally plowed by the rotary hoe blades. The seed dropped at a still lesser depth over the groove cut by the chisel 18 will be isolated from any fertilizer deposited at the chisel. The roots which may develop thereon may penetrate into the groove cut by the blade.

A suitable fertilizer attachment may be connected to the submulcher blade by means of a hose 48 which will extend down to a position adjacent the rear of the chisel 18 and will drop fertilizer through an opening 49. Thus, the fertilizer will be deposited at a depth substantially deeper than the depth to which the seeds are dropped. Therefore, the seeds will not be sterilized by the fertilizer.

It will be noted that the tines 34 and 35 of the rotary hoe wheels are supported on axles 50 by means of suitable bearings 51. It will also be noted that spaces 53 between the path cut by each set of the rotary hoe wheels are untouched so that this space will not dry out during the time that the seed is first planted. Then at the first cultivation, the planter 13 may be removed from the machine and the mulcher and rotary hoe wheels run through the spaces 53. These spaces may thus then be broken up. Thus, the soil between the rows broken by the chisels 18 during planting will then be broken up during cultivation and water penetration will be increased and erosion will be thereby minimized. Also, the water which normally runs off of the soil will be held by the loosened soil to promote plant growth.

The members 38 are clamped at their rear ends to the bar 14. The front ends of the members 38 can be attached to an ordinary tractor hydraulic lift mechanism. Thus, the entire combination can be lifted and lowered by actuating the hydraulic lift mechanism.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In an agricultural machine,
a transversely disposed tool bar adapted to be attached to a tractor,
a plurality of narrow, generally planar, vertically extending subsoiler blades selectively mounted at spaced positions on said tool bar,
a flat, generally horizontal chisel attached to the lower end of each said subsoiler blade for breaking up the subsoil strata at a point well below the topsoil strata,
rolling cultivator assemblies each including a plurality of axially spaced, relatively rotatable, toothed rotary hoe wheels,
means yieldably mounting a rolling cultivator assembly on each of said subsoiler blades,
each of said rolling cultivator assemblies being positioned rearwardly of and in alignment with a respective one of said subsoiler blades and disposed above the plane of operation of said respective chisels for cultivating the topsoil strata above said subsoil strata,
and planter units attached to said tool bar in trailing relation to each of said rolling cultivator assemblies,
said planter units each including a planter runner aligned with the groove formed by a said subsoiler blade and disposed in the topsoil strata above the lower level of operation of said rolling cultivator assemblies for depositing seed or the like therein.

2. The machine recited in claim 1 wherein
said rotary hoe wheels each have closely spaced teeth thereon,
each alternate said wheel having teeth curved in a first direction and each other alternate wheel having teeth thereon curved in the direction opposite from said first teeth,
all said teeth being generally in the same plane.

3. The machine recited in claim 1 wherein
said rolling cultivator assemblies are supported on an axle inclined rearwardly slightly at both ends from the intermediate part of said axle and from the direction of travel of said machine.

4. The machine recited in claim 1 wherein
said means yieldably mounting said rolling cultivator assembly on each said subsoiler blade comprises a rearwardly extending link swingably connected to a said subsoiler blade,
the distal end of said link being connected to said rolling cultivator assembly,
and spring means urging said rolling cultivator assembly into the ground.

References Cited in the file of this patent

UNITED STATES PATENTS

| | | |
|---|---|---|
| 1,169,127 | Craddock | Jan. 25, 1916 |
| 1,403,547 | Greene | Jan. 17, 1922 |
| 1,844,124 | Jordan | Feb. 9, 1932 |
| 1,878,819 | Davis | Sept. 20, 1932 |
| 1,901,299 | Johnson | Mar. 14, 1933 |
| 1,908,110 | Braun | May 9, 1933 |
| 2,734,439 | Padrick | Feb. 14, 1956 |
| 2,748,535 | Skromme | June 5, 1956 |
| 2,782,740 | Wood | Feb. 26, 1957 |

FOREIGN PATENTS

| | | |
|---|---|---|
| 396,550 | Germany | June 24, 1924 |

OTHER REFERENCES

Successful Farming, vol. 54, No. 12, December 1956. (Pages 34 and 35 relied on.)